US011168669B2

(12) United States Patent
Yu et al.

(10) Patent No.: US 11,168,669 B2
(45) Date of Patent: Nov. 9, 2021

(54) METHOD, APPARATUS AND SYSTEM FOR WIND CONVERTER MANAGEMENT

(71) Applicant: ABB Schweiz AG, Baden (CH)

(72) Inventors: Rongrong Yu, Beijing (CN); Niya Chen, Beijing (CN); Hailian Xie, Beijing (CN); Jiayang Ruan, Beijing (CN); Antti Vinko, Espoo (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/737,982

(22) Filed: Jan. 9, 2020

(65) Prior Publication Data
US 2020/0141393 A1 May 7, 2020

Related U.S. Application Data

(63) Continuation of application No. PCT/CN2018/073308, filed on Jan. 18, 2018.

(51) Int. Cl.
*F03D 9/00* (2016.01)
*H02P 9/04* (2006.01)
(Continued)

(52) U.S. Cl.
CPC ............. *F03D 17/00* (2016.05); *F03D 7/048* (2013.01); *F03D 7/028* (2013.01); *F03D 7/047* (2013.01);
(Continued)

(58) Field of Classification Search
CPC .......... F03D 7/028; F03D 7/047; F03D 7/048; F03D 17/00
See application file for complete search history.

(56) References Cited

U.S. PATENT DOCUMENTS 6,316,893 B1 * 11/2001 Rasimus ............. G05B 19/416
318/430
6,925,385 B2 * 8/2005 Ghosh .................. F03D 7/0284
702/1
(Continued)

FOREIGN PATENT DOCUMENTS

CN 103925155 A 7/2014
CN 104131950 A 11/2014
(Continued)

OTHER PUBLICATIONS

Intellecutal Property Office of the P.R. China, International Search Report & Written Opinion issued in corresponding Application No. PCT/CN2018/073308, dated Oct. 12, 2018, 11 pp.
(Continued)

*Primary Examiner* — Tulsidas C Patel
*Assistant Examiner* — Thomas K Quigley
(74) *Attorney, Agent, or Firm* — Greenberg Traurig, LLP

(57) ABSTRACT

A method for wind converter management, first and second data associated with a group of first measurements and a second measurement of the wind converter may be collected respectively. An association between the group of first measurements and the second measurement of the wind converter may be obtained. A condition of the wind converter may be determined based on a comparison of the collected first and second data and the obtained association. Also, the apparatuses, systems, computer readable media and IoT systems for wind converter management.

20 Claims, 5 Drawing Sheets

(51) Int. Cl.
*F03D 17/00* (2016.01)
*F03D 7/04* (2006.01)
*F03D 7/02* (2006.01)

(52) U.S. Cl.
CPC ....... *F05B 2240/96* (2013.01); *F05B 2260/80* (2013.01); *F05B 2260/821* (2013.01); *F05B 2270/32* (2013.01); *F05B 2270/335* (2013.01)

(56) References Cited

U.S. PATENT DOCUMENTS

| | | | | |
|---|---|---|---|---|
| 6,952,662 | B2* | 10/2005 | Wegerich | G06F 17/10 700/29 |
| 6,966,754 | B2* | 11/2005 | Wobben | F03D 17/00 416/61 |
| 6,975,962 | B2* | 12/2005 | Wegerich | G06F 11/3447 702/182 |
| 8,090,972 | B2* | 1/2012 | Bengtson | G05B 23/0237 713/400 |
| 8,150,641 | B2* | 4/2012 | Morjaria | F03D 7/028 702/60 |
| 8,279,073 | B2* | 10/2012 | Gao | F03D 7/0204 340/3.62 |
| 8,355,823 | B2* | 1/2013 | Zhang | F03D 7/0292 700/286 |
| 8,527,453 | B2* | 9/2013 | Garate Ivaro | F03D 7/0224 706/62 |
| 9,644,612 | B2 | 5/2017 | Evans et al. | |
| 2006/0070435 | A1* | 4/2006 | LeMieux | G05B 23/0283 73/168 |
| 2007/0140847 | A1* | 6/2007 | Martinez De Lizarduy Romo | G05B 23/0283 416/11 |
| 2010/0138060 | A1* | 6/2010 | Gao | F03D 17/00 700/287 |
| 2010/0298995 | A1* | 11/2010 | Zhang | F03D 17/00 700/287 |
| 2010/0332272 | A1* | 12/2010 | Ong | G06Q 10/20 705/7.36 |
| 2011/0224926 | A1* | 9/2011 | Morjaria | F03D 7/028 702/60 |
| 2011/0313726 | A1* | 12/2011 | Parthasarathy | G05B 23/024 702/179 |
| 2012/0041575 | A1* | 2/2012 | Maeda | G05B 23/024 700/80 |
| 2012/0203385 | A1* | 8/2012 | Kumar | H02J 3/386 700/287 |
| 2015/0077155 | A1* | 3/2015 | Clausen | F03D 17/00 324/765.01 |
| 2015/0233976 | A1* | 8/2015 | Johannesson | G01R 31/40 324/764.01 |
| 2016/0084234 | A1* | 3/2016 | De Bauw | F03D 9/255 702/41 |

FOREIGN PATENT DOCUMENTS

| | | |
|---|---|---|
| CN | 105134510 A | 12/2015 |
| CN | 105324900 A | 2/2016 |
| CN | 106471247 A | 3/2017 |
| CN | 106640548 A | 5/2017 |
| CN | 102607850 A | 7/2020 |
| EP | 2726734 A1 | 5/2014 |
| WO | 2013000473 A1 | 1/2013 |

OTHER PUBLICATIONS

The Patent Office of the People's Republic of China, First Office Action issued in corresponding Chinese application No. 201880459023, dated Jul. 1, 2020, 22 pp.
Chinese Patent Office, Second Office Action issued in corresponding Application No. 2018800459023, dated Dec. 8, 2020, 8 pp.
Office Action issued for CN Application No. 201880045902.3 dated May 14, 2021.
European Search Report dated Aug. 20, 2021 for Europe Patent Application No. 18900999.6.
Office Action dated Sep. 1, 2021 for Europe Patent Application No. 18900999.6.
Office Action dated Sep. 27, 2021 for China Patent Application No. 201880045902.3.

* cited by examiner

300

| FIRST MEASUREMENT — 310 | | SECOND MEASUREMENT — 320 |
|---|---|---|
| IGBT TEMPERATURE | CABINET TEMPERATURE | OUTPUT POWER |

METHOD, APPARATUS AND SYSTEM FOR WIND CONVERTER MANAGEMENT

TECHNICAL FIELD

Example embodiments of the present disclosure generally relate to wind turbine management, and more specifically, to method, apparatus and system for managing a wind converter of a wind turbine in a wind farm.

BACKGROUND

As wind energy is clean, pollution-free and renewable, wind power plays an increasingly important role in the worldwide exploration of new energy. The wind converter is an important device in the wind turbine, and its condition largely affects the output power of the wind turbine. Statistics show that the wind converter is the component with the highest failure rate, and most of the downtime in the wind turbine is caused by the abnormality of the wind converter. Accordingly, monitoring the condition of the wind converter is a significant task in wind turbine management. Typically, a wind farm is located in a remote area, and the wind turbines are distributed across a large geographic area. Thereby, it takes huge manpower, material resources and time cost in monitoring the condition of the wind converter.

There have been proposed solutions for monitoring the condition of the wind converter based on a physical model generated from a group of predefined measurements of the wind converters. However, these solutions cannot reflect the complex relationship among the group of measurements. Further, various types of wind converters may be included in the wind farm, meanwhile these types of wind converters may work in various conditions. Thereby the physical model should be refined so as to be adapted to each of the wind converters. Till now, no effective solution is found to monitor the condition of the wind converter and manage the wind converter.

SUMMARY

Example embodiments of the present disclosure provide solutions for wind converter management.

In a first aspect, example embodiments of the present disclosure provide a method for wind converter management. The method comprises: collecting first and second data associated with a group of first measurements and a second measurement of the wind converter, respectively; obtaining an association between the group of first measurements and the second measurement of the wind converter; and determining a condition of the wind converter based on a comparison of the collected first and second data and the obtained association. With these embodiments, in order to determine the condition of the wind converter, the association that shows the exact relationship between the group of first measurements and the second measurement of the wind converter is utilized as a standard. Therefore, this association may be much accurate than the prior physical model and it is not required to adapt the physical model to each of the to-be-monitored wind converter.

In some embodiments, the determining a condition of the wind converter comprises: generating an estimation of the second data based on the association and the collected first data; and determining the condition of the wind converter based on a difference between the estimation of the second data and the collected second data. With these embodiments, the estimation of the second data may show an estimated trend of the second data associated the collected first data. As the association may indicate an expected relationship between the group of first measurements and the second measurement, if there is a great mismatch between the estimation and the second data, it may indicate a potential abnormal condition in the wind converter. Accordingly, the condition of the wind converter may be monitored in a simple and effective way based on a determination of the difference.

In some embodiments, the determining the condition of the wind converter based on the difference comprises: in response to the difference being above a predefined threshold, identifying the condition as abnormal; and/or in response to the difference being below the predefined threshold, identifying the condition as normal. With these embodiments, the condition of the wind converter may be determined based on a simple comparison operation, which may greatly reduce the time and manpower cost in monitoring the condition of the wind converter. It is to be understood that the condition described in the context of the present disclosure may indicate an early diagnosis of the wind converter. For example, the threshold may vary based on different purposes. If it is expected to detect a symptom of a potential abnormality, the threshold may be set to a low value to provide an early diagnosis. Moreover, a larger threshold may be defined for indicating a serious condition.

In some embodiments, the method further comprises: in response to the determined condition being abnormal, a severity of the wind converter may be determined based on a change over time in the difference; determining a lifetime of the wind converter based on the determined severity; and/or detecting a cause of the abnormal condition based on monitoring a condition of at least one component in the wind converter. With these embodiments, the lifetime, the severity, and/or the cause of the abnormal condition may provide more grounds to engineers for further remedial operations. Therefore, the engineers may prescheduled their daily work and fix the abnormal wind converter in an orderly manner.

In some embodiments, the obtaining an association comprises: collecting historical first and second data associated with the group of first measurements and the second measurement of the wind converter, respectively; and obtaining the association by establishing a knowledge model based on the collected historical first and second data. With these embodiments, it may be assured that the association is generated based on the historical data of the to-be-monitored wind converter, and therefore the association may indicate a dedicated relationship which may accurately reflect the historical operation of this wind converter. Based on its own historical operation, the condition of the wind converter may be much reliable. Further, compared with the traditional solution where the measurements are only used for managing a specific component in the wind converter, measurements may be reused in these embodiments for determining a general condition of the wind converter.

In some embodiments, the collecting historical first and second data comprises: collecting the historical first and second data during a period when the condition of the wind converter is normal. With these embodiments, the association may be generated from the historical data that reflects the normal condition. Accordingly, based on the collected data and the association may show an excepted normal operation, the abnormal condition of the wind converter may be easily detected.

In some embodiments, the method further comprises: adjusting a second power of the wind converter based on the determined condition. With these embodiments, once an abnormal condition is detected in the wind converter, an early maintenance at a level of the wind converter (such as lowering down the output power) may be implemented so as to protect the abnormal wind converter from further damage.

In some embodiments, the method further comprises: with respect to a group of wind converters located in a wind farm in which the wind converter is located, adjusting an output power dispatch among the group of converters based on the determined condition. With these embodiments, once an abnormal condition is detected in the wind converter, an early maintenance at a level of the wind farm (such as rescheduling the output powers among the wind converters in the wind farm) may be implemented so as to provide a stable output power from the wind farm.

In some embodiments, the obtaining an association comprises: selecting a reference association between a group of first measurements and a second measurement of a reference wind converter; and obtaining the association by modifying the reference association based on at least one of: types of the wind converter and the reference wind converter; geographic locations of the wind converter and the reference wind converter; and operation period of the wind converter and the reference wind converter. With these embodiments, even no association is generated for the to-be-monitored wind converter, the reference association of the reference wind converter may be modified to adapt to the situation of the to-be-monitored wind converter.

In a second aspect, example embodiments of the present disclosure provide an apparatus for wind converter management. The apparatus comprises: a collecting unit configured to collect first and second data associated with a group of first measurements and a second measurement of the wind converter, respectively; an obtaining unit configured to obtain an association between the group of first measurements and the second measurement of the wind converter; and a determining unit configured to determine a condition of the wind converter based on a comparison of the collected first and second data and the obtained association.

In some embodiments, the determining unit comprises: an estimation generating unit configured to generate an estimation of the second data based on the association and the collected first data; and a condition determining unit configured to determine the condition of the wind converter based on a difference between the estimation of the second data and the collected second data.

In some embodiments, the condition determining unit is further configured to: in response to the difference being above a predefined threshold, identify the condition as abnormal; and in response to the difference being below the predefined threshold, identify the condition as normal.

In some embodiments, the apparatus further comprises: a lifetime determining unit configured to, in response to the determined condition being abnormal, a severity determining unit configured to determine a severity of the wind converter based on a change over time in the difference; determine a lifetime of the wind converter based on the determined severity; and a cause determining unit configured to detect a cause of the abnormal condition based on monitoring a condition of at least one component in the wind converter.

In some embodiments, the obtaining unit comprises: a historical data collecting unit configured to collect historical first and second data associated with the group of first measurements and the second measurement of the wind converter, respectively; and an association obtaining unit configured to obtaining the association by establishing a knowledge model based on the collected historical first and second data.

In some embodiments, the historical data collecting unit is further configured to collect the historical first and second data during a period when the condition of the wind converter is normal.

In some embodiments, the apparatus further comprises: an adjusting unit configured to adjust an output power of the wind converter based on the determined condition.

In some embodiments, the apparatus further comprises: an adjusting unit configured to, with respect to a group of wind converters located in a wind farm in which the wind converter is located, adjust an output power dispatch among the group of converters based on the determined condition.

In some embodiments, the obtaining unit comprises: a reference selecting unit configured to selecting a reference association between a group of first measurements and a second measurement of a reference wind converter; and a forming unit configured to form the association by modifying the reference association based on at least one of: types of the wind converter and the reference wind converter; geographic locations of the wind converter and the reference wind converter; and operation period of the wind converter and the reference wind converter.

In a third aspect, example embodiments of the present disclosure provide a system for wind converter management. The system comprises: a computer processor coupled to a computer-readable memory unit, the memory unit comprising instructions that when executed by the computer processor implements the method for wind converter management.

In a fourth aspect, example embodiments of the present disclosure provide a computer readable medium having instructions stored thereon, the instructions, when executed on at least one processor, cause the at least one processor to perform the method for wind converter management.

In a fifth aspect, example embodiments of the present disclosure provide an Internet of Things (IoT) system. The system comprises: a group of wind converter; and an apparatus for wind converter management.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Figure 1:
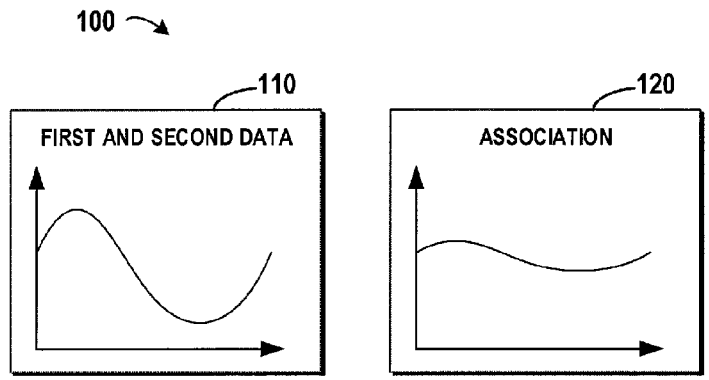
FIG. 1 illustrates a schematic diagram for wind converter management in accordance with embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

In the field of wind converter management, solutions based on physical model between measurements have been proposed to identify the abnormal wind converter in the wind turbine in the wind farm. Prior solutions focus on how to build physical model to analyze whether the wind converter is normally operating or not. However, the measurements are selected from a predefined group, and the physical model is based on historical experience (for example, the temperature will increase if the output power increase). Therefore, these solutions cannot reflect the complex relationship among all the measurements of the wind converter. Further, the physical model should be adjusted before being shared by different converters, which may result great costs in time and computing. Accordingly, how to determine whether a wind converter is normal or not in a much efficient and convenient manner becomes a focus.

In order to at least partially solve the above and other potential problems, a new method for wind converter management is proposed according to embodiments of the present disclosure. For the sake of description, implementations of the present disclosure will be described in an environment of a wind farm. The wind farm may comprise a plurality of wind turbines. Further, the wind turbine may comprise various devices and among them the wind converter for converting the wind power to the electrical power is a particular important one. Accordingly, the condition of the wind converter is a key factor for indicating the health of the wind turbine.

It is understood that the wind converter is a complex device and a plurality of measurements may be associated with the wind converter. For example, the output power is an important measurement for judging whether the wind converter is in good condition. Moreover, the temperatures of various components (such as Insulated Gate Bipolar Transistor (IGBT)) in the wind converter may also be important measurements for determining the condition. Reference will be made to FIG. 1 to provide a general description of one embodiment of the present disclosure. Referring to FIG. 1, it illustrates a schematic diagram for wind converter management in accordance with embodiments of the present disclosure.

As illustrated in FIG. 1, during the operation of the wind converter, the first and second data 110 associated with the above first and second measurements may be collected in real time. Further, a predefined association 120 between the first and second measurements may be obtained as a standard for judging whether the wind converter is abnormal. Based on a comparison of the collected first and second data 110 and the obtained association 120, the condition of the wind converter may be determined. Regarding the example of FIG. 1, as the pattern of the collected first and second data 110 is significantly different from that of the association 120, it is possibly that the wind converter is in an abnormal condition.

Here, the association 120 may reflect an association between the first measurements and the second measurement of the wind converter when the wind converter is working in a normal condition. Accordingly, the association 120 may reflect a "correct" relationship between the first and second measurements when the wind converter runs normally. Therefore, the association 120 may serve as a standard for the further judging. If the collected first and second data 110 deviates from the association 120 to a certain degree, it may be determined that the wind condition may be in an abnormal condition.

According to FIG. 1, the association 120 that shows the exact relationship between the group of first measurements and the second measurement of the wind converter is utilized as a standard for determining the condition of the wind converter. Therefore, this association 120 may be much accurate than the prior physical model and it does not required to adapt the physical model to each of the to-be-monitored wind converter.

It is to be understood that FIG. 1 is just an example for illustrating the general idea of embodiments of the present disclosure, and the patterns of the relationship between the first and second measurements are just for illustration. Although only one first measurement (such as the IGBT temperature) is illustrated in FIG. 1 and the association 120 shows an 2-dimension pattern, in a specific environment, there may be several first measurements and thus the association 120 may show a different pattern with a higher dimensions. In this embodiment, the first and second data may be considered as input and output of the curves.

Figure 2:
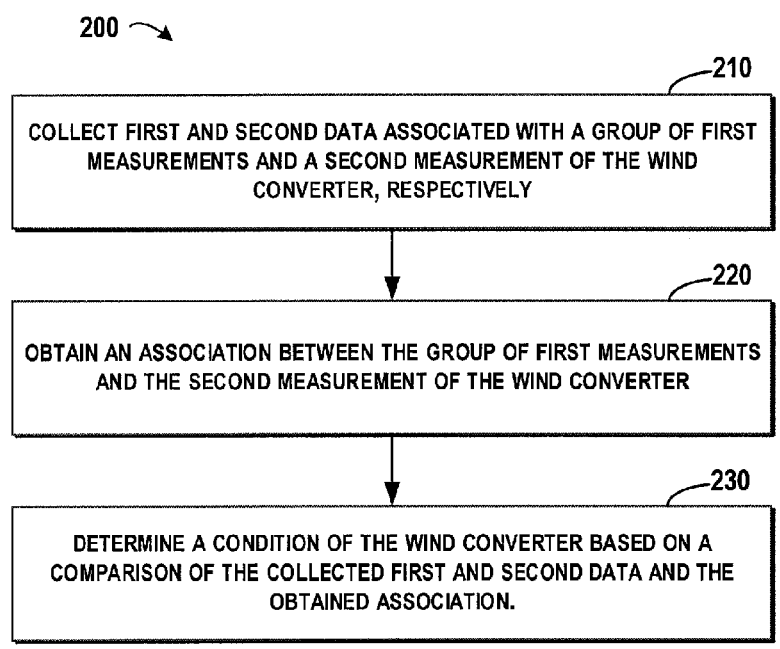
FIG. 2 illustrates a schematic flowchart of a method for wind converter management in accordance with embodiments of the present disclosure.

Details of the embodiments of the present disclosure will be provided with reference to FIG. 2, which illustrates a schematic flowchart of a method 200 for wind converter management in accordance with embodiments of the present disclosure. At 210, first and second data 110 associated with a group of first measurements and a second measurement of the wind converter may be collected respectively. Here, the data 110 may be collected by embedded sensors via wired/wireless communication networks, and the group of first measurements may comprise one or more measurements. In a simplified example, the group may comprise only one first measurement such as the IGBT temperature. In another example, the group may comprise two first measurements such as the IGBT temperature and the cabinet temperature.

Figures 3, 4:
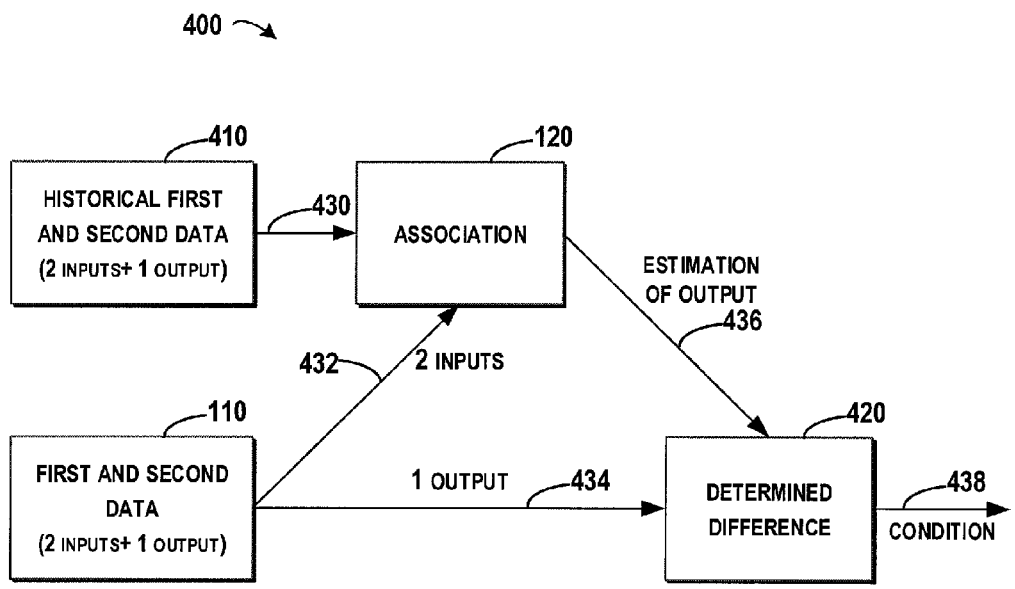
FIG. 3 illustrates a schematic diagram for a data structure of the first and second data in accordance with embodiments of the present disclosure.
FIG. 4 illustrates a schematic diagram for wind converter management in accordance with embodiments of the present disclosure.

Details of the embodiments of the present disclosure will be provided with reference to FIG. 3, which illustrates a schematic diagram for a data structure 300 of the first and second data in accordance with embodiments of the present disclosure. In FIG. 3, the first and second data 110 may comprise two portions, where a reference number 310 may indicate the collected first data associated with a group of first measurements, and a reference number 320 may indicate the collected second data associated with the second measurement. In the context of the present disclosure, the IGBT temperature and the cabinet temperature are just examples of first measurements. The output power of the wind converter is also an example of the second measurement. Here, the two temperatures and the output power are selected because they are typical factors for indicating the condition of the wind converter. Once the temperatures go beyond a certain threshold, a short circuit may result in a shutdown of the wind converter, and thus the output power may drop to zero. Further, an association may be generated based on this and then the generated association among the temperatures and the output power may serve as a standard for detecting an abnormal condition.

It is to be understood that the data structure as illustrated in FIG. 3 is just an example for illustration without the purpose of limitation. In another embodiment, other first and second measurements may be selected based on a specific type (including brand and model) of the wind converter. Table 1 illustrates a plurality of measurements associated with a specific brand and model that may be included in the first and second measurements.

TABLE 1

Example Measurements for Wind Converter

| Measurement Name | Description |
| --- | --- |
| AIPt100 | Measured value of the Pt100 temperature |
| CabinTemp | Measured cabinet temperature |
| ISUPPTemp | The maximum of the measured IGBT temperature of the grid-side converter |
| ISUCurrent | Grid-side current of the grid-side converter |
| ISUPower | Grid-side power of the grid-side converter |
| ISUReactP | Grid-side reactive power of the grid-side converter |
| PPTemp | The maximum of the measured IGBT temperature of the rotor-side converter |
| RotorIU | The measured rotor current of phase U |
| RotorIY | The measured rotor current of phase U and W transferred into xy-coordinates |
| RotorPower | The rotor (rotor-side converter output) power |
| SwitchingFreq | The switching frequency produced by the DTC modulation* |
| PhaseUTempDif | Difference between the maximum phase U temperature and the average from the rest of the power modules |
| PhaseVTempDif | Difference between the maximum phase V temperature and the average from the rest of the power modules |
| PhaseWTempDif | Difference between the maximum phase W temperature and the average from the rest of the power modules |
| ISUMainVolt | The grid voltage of the grid-side converter. |
| MinPHtoPHVolt | The lowest measured ph-to-ph rms voltage in volts |
| RotorVoltage | The calculated effective (rms) rotor voltage |
| SeqVolt | The grid voltage negative sequence in volts. |
| EfCurrrentAct | The actual value of measured current unbalance |
| DCVoltage | The measured DC link voltage |

In embodiments of the present disclosure, the first and second measurements may comprise at least one portion of the measurements as illustrated in Table 1 as long as there is a causal relationship between the first and the second measurements. It is to be understood that Table 1 just shows example measurements for one specific wind converter. For another wind converter with another type, the measurements may comprise more, less or different measurements.

In embodiments of the present disclosure, the first and second measurements may be selected based on prior knowledge. As described, the prior knowledge shows that the temperatures and output power have a causal relationship and may indicate the condition of the wind converter. Therefore, the temperatures and output power may be selected. Although the prior knowledge may provide some association among portions of the measurements, as the number of the measurements may be great and the association among the measurements may be complex, the prior physical model is not enough for determining potential association. Accordingly, a machine learning process may be adopted for determining the association, and the measurements with strong association relationship may be selected.

Referring back to FIG. 2, at 220, an association 120 between the group of first measurements and the second measurement of the wind converter may be obtained. Here, the embodiment does not limit how to obtain the association. In one embodiment, the association 120 may be a predefined one that stored in data storage. Alternatively, the association 120 may be generated from the historical first and second data of the wind converter.

At 230, a condition of the wind converter may be detected based on a comparison of the collected first and second data 110 and the obtained association 120. One rule for determining the condition is to compare the collected first and second data 110 and the obtained association 120, to detect whether the data 110 deviates from the association 120. Multiple methods may be adopted for the comparison, for example, another association may be generated from the data 110. Then the generated association may be compared with obtained association 120, so as to see whether the generated association deviates from the association 120. In another example, the collected first data may be entered into the association 120 to generate an estimation of the second data, and then the comparison may be performed between the estimation of the second data and the collected second data.

In these embodiments, the association 120 may be considered as a function, where the group of first measurements of the wind converter server as the input for the function, and second measurement of the wind converter servers as the output for the function. In embodiments of the present disclosure, the association 120 records the relationship between the first measurements and the second measurement, when the collected data associated with the first measurements is entered into the association 120, the estimation of the second data may be generated. Accordingly, with simply mathematic computing, the estimation may be determined without a need of high computing workload. Here, the estimation may indicate an expected value of the second data corresponding to the first data. Based on a difference between the estimation of the second data and the collected second data, the condition of the wind converter may be determined.

Reference will be made to FIG. 4 for providing the details of the determining the condition. FIG. 4 illustrates a schematic diagram 400 for wind converter management in accordance with embodiments of the present disclosure. The association 120 may indicate association between the group of first measurements and the second measurement of the wind converter when the wind converter is working in a normal condition. The first and second data 110 may comprise two first measurements and one second measurement. Here, depending on a specific requirement, the first and second data 110 may be collected during a time duration such as one or more weeks or another time duration. Based on a sampling interval of the collecting, the granularity of the data 110 may be set to one or more minutes or another time interval.

As illustrated by an arrow 432, the first data (2 inputs) in the collected first and second data 110 may be provided to the association 120. Then, referring to an arrow 436, estimations of the second data (such as the output) at each time points may be computed. At this point, the estimation as illustrated by 436 and the second data 434 in the collected first and second data 110 may be compared to determine a difference 420 there between. Based on the value of the difference 420, a condition 438 may be determined.

In some embodiments of the present disclosure, historical first and second data associated with the group of first measurements and the second measurement of the wind converter may be collected respectively, and then the association may be obtained by establishing a knowledge model based on the collected historical first and second data. As illustrated in FIG. 4, the association 120 maybe generated from historical first and second data 410 which comprises the same first and second measurements as those of the collected data 110. In these embodiments, the historical first and second data may be collected during a period when the condition of the wind converter is normal, such that it may be ensured that the association 120 generated therefrom represents normal behaviors of the wind converter.

In these embodiments, it may be assured that the association 120 is generated from the historical data of the to-be-monitored wind converter, and therefore the association may indicate a dedicated relationship which may accurately reflect the historical operation of this wind converter. Based on its own historical operation, the condition of the wind converter may be much reliable. Further, the measurements of the wind converter may be used for the regular operation of the wind converter, meanwhile these measurements may be reused for generating the association for monitoring the general condition of the wind converter without additional hardware added into the wind converter.

Various machine learning solutions (such as Support Vector Machine (SVM), Neural Network, or Gaussian Process, and the like) may be adopted to establish the association 120. Those skilled in the art may refer to corresponding algorithms and details of the machine learning will be omitted hereinafter. The association 120 may be generated by various devices. For example, a server at a data center may receive the historical data and then generate the association 120. In another example, a computing device deployed at the wind turbine may generate the association 120.

Figure 5:
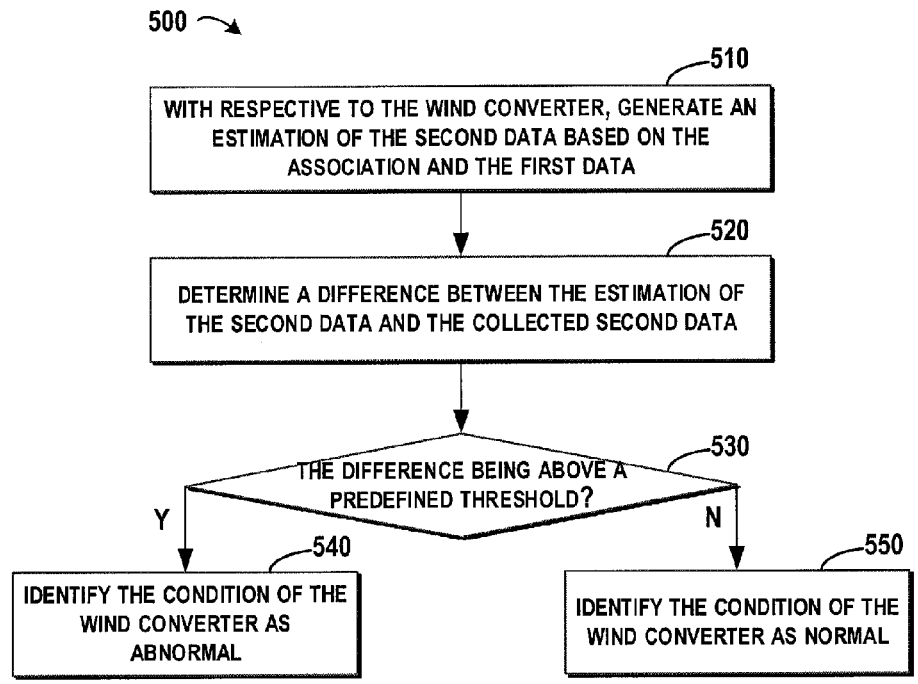
FIG. 5 illustrates a schematic flowchart of a method for determining a condition of a wind converter in accordance with embodiments of the present disclosure.

FIG. 5 illustrates a schematic flowchart of a method 500 for determining a condition of a wind converter in accordance with embodiments of the present disclosure. At 510, an estimation of the second data may be generated based on the association 120 and the first data. At 520, a difference may be determined between the estimation and the collected second data. At 530, the difference is compared with a predefined threshold, if the difference is above the threshold, then the wind converter may be identified as an abnormal (as illustrated in 540), otherwise the wind converter may be identified as a normal (as illustrated in 550).

It is to be understood that FIG. 5 illustrates an example where only one predefined threshold is provided, in other embodiments of the present disclosure, one or more predefined threshold may be provided for the comparison. In some embodiments, in response to the difference being between a first and a second predefined threshold, the condition of the wind converter may be identified as a first condition. In some embodiments, in response to the difference being between a second and a third predefined threshold, the condition of the wind converter may be identified as a second condition.

In the embodiments of the present disclosure, the association 120 among all the historical first and second data 410 is learned by the machine learning itself. In additional to and/or alternatively, the association 120 may be based on experts' knowledge. Further, the association 120 may be generated based on a regression method.

During the process of collecting the first and second data 110, noise and redundant signals may be filtered from the collected data 110. Similarly, during the process of collecting the historical data, the filtering process may be performed to the historical data. In some embodiments, a wavelet de-noising process may be performed to the collected data 110. Optionally, feature extraction such as Fast Fourier Transform (FFT) may be performed on the collected data. With the above filtering and extracting process, the processed data become sensitive data that may reflect the changes associated with the first and second measurements.

Figure 6:
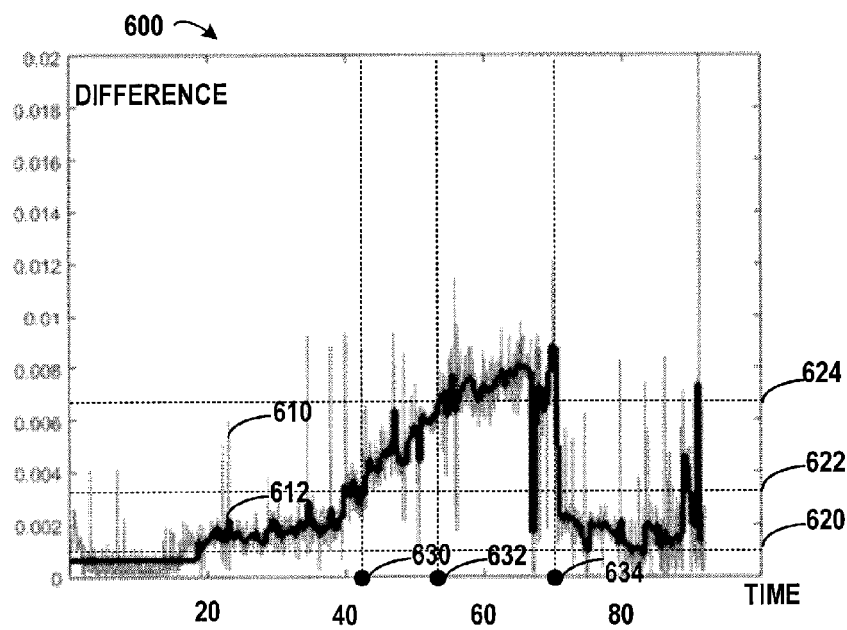
FIG. 6 illustrates a schematic diagram for identifying an abnormal wind converter based on a difference between the estimation of the second data and the second data in accordance with embodiments of the present disclosure.

Details about how to determine the condition will be described with reference to FIG. 6, which illustrates a schematic diagram 600 for identifying an abnormal wind converter based on a difference between the estimation of the second data and the second data in accordance with embodiments of the present disclosure. Continuing the above example, the schematic diagram 600 is generated based on the difference between the estimation and the collected second measurement (output power). As illustrated in FIG. 6, the horizontal axis indicates time duration and the vertical axis indicates a difference of the estimated the output power and the collected output power. Here, the horizontal and vertical axes may be defined in units of days and kilowatt, respectively. In another embodiments, the units may be defined in another format, for example, the horizontal axis may be defined in a finer granularity of hours and the amplitude of the vertical axis may be normalized to an area of [0, 1].

Referring to FIG. 6, a wave 610 shown in gray indicates a computed difference between the estimation and the collected output power, and a wave 612 shown in black indicates a filtered difference by removing noises in the computed difference. At this point, the filtered difference may serve as a standard for determining the condition. In some embodiments of the present disclosure, one or more thresholds may be defined for one or more conditions, respectively. As illustrated at the bottom of FIG. 6, a line 620 indicates a threshold corresponding to a normal condition where the wind converter runs in a regular manner, a line 622 indicates a threshold corresponding to an abnormal condition where the wind converter should be checked for safety reasons, and a line 624 indicates a threshold corresponding to an alarm condition where the wind converter should be shut down and replaced by a new one. With these embodiments, the condition of the wind converter may be determined based on a simple comparison operation, which may greatly reduce the time and manpower cost in monitoring the condition of the wind converter.

As illustrated in FIG. 6, the wave 612 may be compared with the lines 620, 622 and 624 respectively. For example, at a time point of 630, the wind converter enters into the abnormal condition and trouble-shooting engineers should be sent to check and fix the exception in the wind converter. Referring to the time duration between the time points 630 and 632, it indicates a situation where the abnormal condition is not fixed, instead, the wave 612 goes up and reaches the line 624 at the time point 632. At this point, the wind converter is seriously abnormal and should be replaced. At the time point 634, the abnormal wind convert is replaced with a new one and then the wave 612 drops down after the time point 634. Although the wave 612 drops, it is still within the abnormal area between the lines 620 and 622. At this point, the trouble-shooting engineers should check and repair the new wind converter.

In some embodiments of the present disclosure, further processing should be made to the abnormal wind converter. In one embodiment, once the wind converter is identified as an abnormal one, a lifetime of the wind converter may be estimated based on a change over time in the difference. Referring to FIG. 6 again, the abnormal condition between the lines 622 and 624 may be further divided into multiple severity levels (such as low, medium, and high). The Remaining Useful Lifetime (RUL) may be determined based on level to which the wave 612 belongs. Here, the lifetime corresponding to each severity level may be defined based on the prior knowledge. For example, the lifetimes for low, medium and high levels may be set to 5 days, 10 days and 15 days, respectively. In these embodiments, the lifetime may provide early diagnosis for the potential risk in the wind converter.

In another embodiment, a cause of the abnormal condition may be detected based on monitoring a condition of at least one component in the wind converter. After the abnormal wind converter is found, a cause of the abnormal condition may be traced into the wind converter, so as to find which component causes the defect. With these embodiments, a cause may be traced into the wind converter, such that trouble-shooting engineers may check and fix the exception in a more efficient way. Usually, the wind component may comprise multiple components and each component may have a group of first measurements and a second measurement. At this point, with respect to each of the multiple components, first and second data may be collected and an association for the component may be obtained.

Further, the condition of the component may be identified as abnormal/normal based on similar method for monitoring the wind converter as described in the preceding paragraphs. It is to be understood that the first and second measurements may vary for different types of components. For the IGBT component in the wind converter, the first measurements may be selected from the current, the cabinet temperature, the wind speed, and so on; while the second measurement may be the IGBT temperature. For the capacitor component in the wind converter, the first and second measurements may be selected from the current and voltage, as long as these measurements may reflect the healthy condition of the capacitor.

With the above embodiments, the lifetime, the severity, and/or the cause of the abnormal condition may provide more grounds to engineers for further remedial operations. Therefore, the engineers may preschedule their daily work and fix the abnormal wind converter in an orderly manner. In some embodiments of the present disclosure, further management may be implemented to the abnormal wind converter. For example, an output power of the abnormal wind converter may be adjusted. Alternatively, for a wind farm in which the abnormal wind converter is located, an output power dispatch among a group of wind converters in the wind farm based on the determined condition.

Here, the monitoring result generated based on the above description may be sent to a control center of the wind turbine to which the abnormal wind converter belongs, so as to adjust the output power accordingly. If the abnormal condition is evaluated to be very serious, the output power of the corresponding wind turbine may be set to a value lower than the original value so as to reduce the workload of the wind converter. In another example, the monitoring result may also be sent to a service center to inform the trouble-shooting engineers to schedule maintenance and repair activities. If multiple wind converters are identified as abnormal with respect to similar causes of exceptions, these wind converters may be repaired together so as to reduce the maintenance cost. In still another example, the monitoring result may be sent to the farm control center to guide power dispatch among wind turbines. Here, the abnormal wind converter may be allocated with a lower output power and the normal wind converters may be allocated with a higher output power, such that the total output power of the wind farm may remain unchanged.

The above paragraphs have described how to determine the association 120 based on historical first and second data. Sometimes, historical first and second data 110 may not be available for a newly launched wind converter or a wind converter where the historical data is lost due to some reasons. Embodiments of the present disclosure also provide solutions for determining an association for a target wind converter based on an association for a reference wind converter. With these embodiments, even no association is generated for the to-be-monitored wind converter, the reference association of the reference wind converter may be modified to adapt to the situation of the to-be-monitored wind converter.

Figure 7:
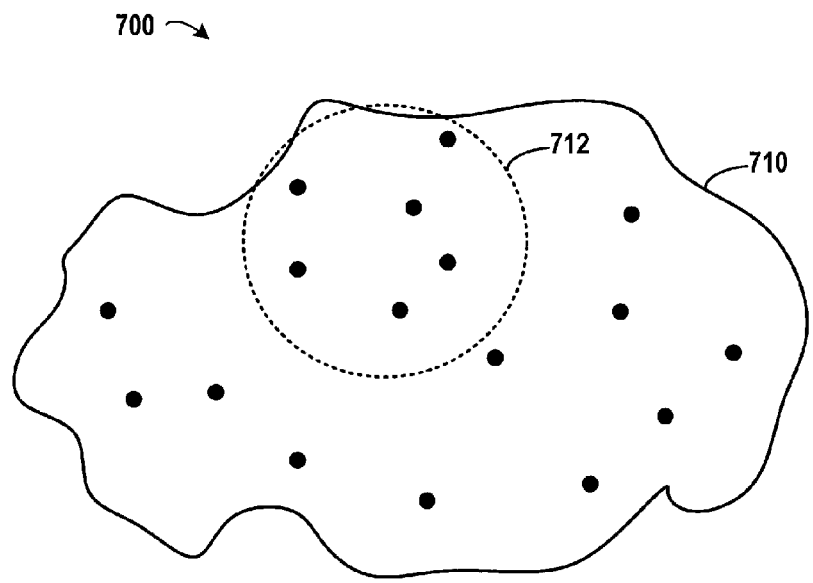
FIG. 7 illustrates a schematic diagram for determining an association for a target wind converter based on an association for a reference wind converter in accordance with embodiments of the present disclosure.

FIG. 7 illustrates a schematic diagram 700 for determining an association for a target wind converter based on an association for a reference wind converter in accordance with embodiments of the present disclosure. Referring to FIG. 7, a reference number 710 indicates a wind farm comprising multiple wind turbines (shown by dots), where each of the wind turbines may comprise one wind converter. In FIG. 7, an area 712 indicates a group of wind converters locate with near geographic locations. Usually, the meteorological environments at the wind converters within the area 712 may be similar, and thereby the associations for the wind converters within the area 712 may also be similar. At this point, if historical first and second data exists for only one wind converter ("WC1") within the area 712, then the association for "WC1" may be taken as a reference association for the other wind converters within the area 712.

By modifying the reference association, an association may be obtained for another wind converter (such as "WC2" within the area 712). For example, if "WC2" locates in a position where the wind is stronger than that at the position of "WC1," then reference association may be modified toward a trend that the output power is slightly increased in the modified association. For another example, if the environment at "WC2" is almost the same as that at "WC1," the reference association may be used directly as the association for "WC2."

Figure 8:
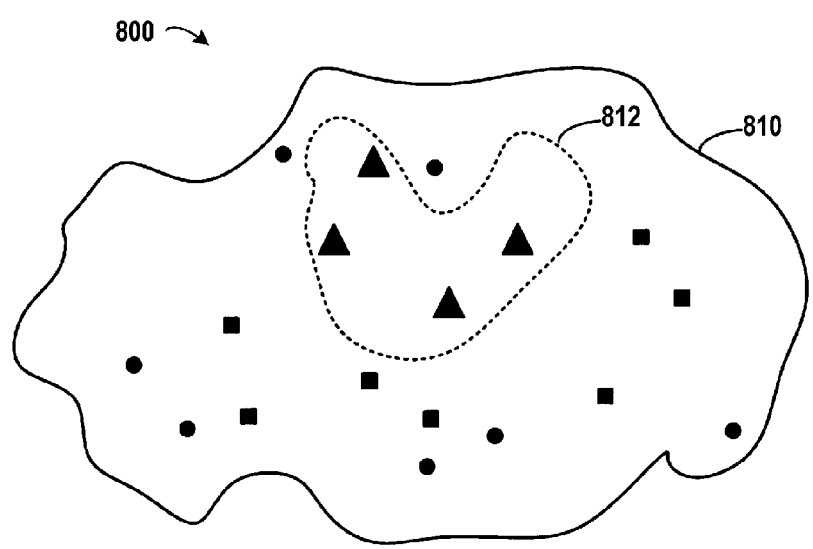
FIG. 8 illustrates a schematic diagram for determining an association for a target wind converter based on an association for a reference wind converter in accordance with embodiments of the present disclosure.

It is to be understood that FIG. 7 only illustrates an ideal situation where all the wind converters are of the same type. Usually, a typical wind farm may comprise wind converters with different types. FIG. 8 illustrates a schematic diagram 800 for determining an association for a target wind converter based on an association for a reference wind converter in accordance with embodiments of the present disclosure. In FIG. 8, the wind farm 810 comprises wind converters with different types, where dots may indicate wind converters of type A and triangles may indicate wind converters of type B. As the first and second measurements may vary for wind converters with different types, wind converters with the same type may be divided into a same group (as indicated by an area 812), such that the association for one wind converter in the group may be shared by others.

In embodiments of the present disclosure, besides the geographic location and the type of the wind converters, the operation period since the wind converter has been launched in the wind farm may be considered as another factor for modifying the reference association. Usually, the performance of the wind converter may drop as the operation period increases. Continuing the above example, if "WC2" is older than "WC1," then reference association may be modified toward a trend that the output power is slightly decreased in the modified association. It is to be understood that the above paragraphs provide example factors for selecting and modifying the reference association, in other embodiments, other factors other than the geographic location, the type and the operation period may be used.

It is to be understood that the above paragraphs have described how to monitor the condition of one wind converter. In other embodiments of the present disclosure, the above described method may be implemented for each of the wind converters in the wind farm. Here, the condition of a target wind converter may be monitored based on an association dedicated to the target wind converter. As the dedicated association may accurately represent the relationship between the first and second measurements, the monitoring results based on the dedicated association may be more reliable.

With embodiments of the present disclosure, a condition of a wind converter in the wind farm may be monitored based on data collected in real time and an association between first and second measurements of the wind converter. Further, based on the monitored conditions, the maintenance activity may be scheduled in advance in a more efficient manner, potential loss caused by device breakdown may be reduced, and the lifetime of whole wind farm may be balanced proactively. Although the preceding paragraphs have described details of the methods for wind converter management. The embodiments of the present disclosure may be implemented by apparatuses, systems, and computer readable medium.

Figure 9:
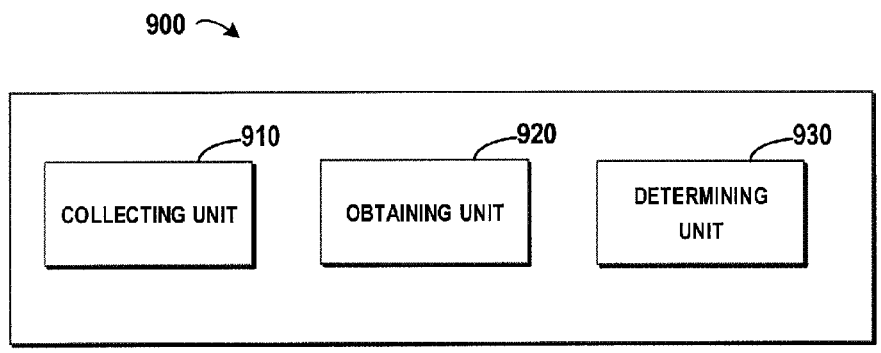
FIG. 9 illustrates a schematic diagram of a system for wind converter management in accordance with embodiments of the present disclosure.

In some embodiments of the present disclosure, an apparatus for wind converter management is provided. FIG. 9 illustrates a schematic diagram of an apparatus 900 for wind converter management in accordance with embodiments of the present disclosure. As illustrated in FIG. 9, the apparatus 900 may comprises: a collecting unit 910 configured to collect first and second data associated with a group of first measurements and a second measurement of the wind converter, respectively; an obtaining unit 920 configured to obtain an association between the group of first measurements and the second measurement of the wind converter; and a determining unit 930 configured to determine a condition of the wind converter based on a comparison of the collected first and second data and the obtained association. Here, the apparatus 900 may implement the method for wind converter management as described in the preceding paragraphs, and details will be omitted hereinafter.

Figure 10:
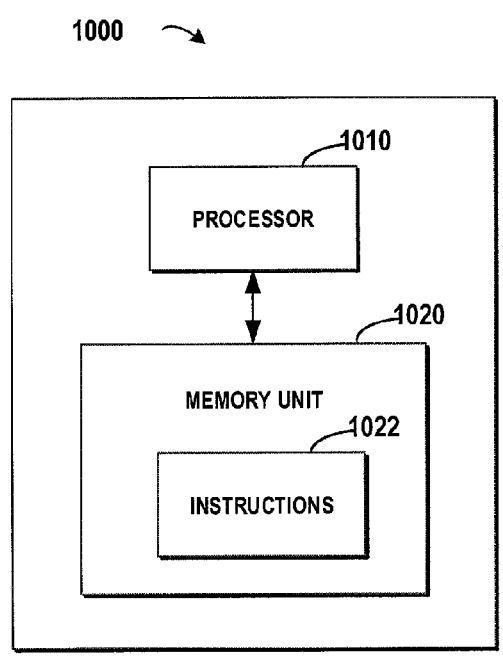
FIG. 10 illustrates a schematic diagram of an apparatus for wind converter management in accordance with embodiments of the present disclosure.

In some embodiments of the present disclosure, a system for wind converter management is provided. FIG. 10 illustrates a schematic diagram of a system 1000 for wind converter management in accordance with embodiments of the present disclosure. As illustrated in FIG. 10, the system 1000 may comprise a computer processor 1010 coupled to a computer-readable memory unit 1020, and the memory unit 1020 comprises instructions 1022. When executed by the computer processor 1010, the instructions 1022 may implement the method for wind converter management as described in the preceding paragraphs, and details will be omitted hereinafter.

In some embodiments of the present disclosure, a computer readable medium for wind converter management is provided. The computer readable medium has instructions stored thereon, and the instructions, when executed on at least one processor, may cause at least one processor to perform the method for wind converter management as described in the preceding paragraphs, and details will be omitted hereinafter.

In some embodiments of the present disclosure, an Internet of Things (IoT) system for wind converter management is provided. The IoT may comprise a group of wind converter; and an apparatus for wind converter management as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a wind converter, comprising:
   selecting a group of first measurements and a second measurement that have a causal relationship from a plurality of measurements of the wind converter based on a machine learning process, the group of first measurements and the second measurement being measurements for various components within the wind converter;
   collecting first and second data associated with the group of first measurements and the second measurement of the wind converter, respectively;
   obtaining an association between the group of first measurements and the second measurement of the wind converter, wherein the obtaining an association comprises:
      selecting a reference association between a group of first measurements and a second measurement of a reference wind converter; and
      obtaining the association by modifying the reference association based on at least one of:
         types of the wind converter and the reference wind converter; and
         geographic locations of the wind converter and the reference wind converter; and
   determining a condition of the wind converter based on a comparison of the collected first and second data and the obtained association.

2. The method of claim 1, wherein the determining a condition of the wind converter comprises:
   generating an estimation of the second data based on the association and the collected first data; and
   determining the condition of the wind converter based on a difference between the estimation of the second data and the collected second data.

3. The method of claim 2, wherein the determining the condition of the wind converter based on the difference comprises:
   in response to the difference being above a predefined threshold, identifying the condition as abnormal; and/or
   in response to the difference being below the predefined threshold, identifying the condition as normal.

4. The method of claim 3, further comprising:
   in response to the determined condition being abnormal, determining a severity of the wind converter based on a change over time in the difference;
   determining a lifetime of the wind converter based on the determined severity; and/or
   detecting a cause of the abnormal condition based on monitoring a condition of at least one component in the wind converter.

5. The method of claim 1, wherein the obtaining an association comprises:
   collecting historical first and second data associated with the group of first measurements and the second measurement of the wind converter, respectively; and
   obtaining the association by establishing a knowledge model based on the collected historical first and second data.

6. The method of claim 5, wherein the collecting historical first and second data comprises:
   collecting the historical first and second data during a period when the condition of the wind converter is normal.

7. The method of claim 1, further comprising:
   adjusting an output power of the wind converter based on the determined condition.

8. The method of claim 1, further comprising:
   with respect to a group of wind converters located in a wind farm in which the wind converter is located, adjusting an output power dispatch among the group of converters based on the determined condition.

9. The method of claim 1, wherein modifying the reference association further comprises:
   modifying the reference association based on an operation period of the wind converter and the reference wind converter.

10. An apparatus for managing a wind converter, comprising:
    a selecting unit configured to select a group of first measurements and a second measurement that have a causal relationship from a plurality of measurements of the wind converter based on a machine learning process, the group of first measurements and the second measurement being measurements for various components within the wind converter;
    a collecting unit configured to collect first and second data associated with the group of first measurements and the second measurement of the wind converter, respectively;
    an obtaining unit configured to obtain an association between the group of first measurements and the second measurement of the wind converter, wherein the obtaining unit comprises:

a reference selecting unit configured to selecting a reference association between a group of first measurements and a second measurement of a reference wind converter; and a forming unit configured to form the association by modifying the reference association based on at least one of:
- types of the wind converter and the reference wind converter; and
- geographic locations of the wind converter and the reference wind converter; and a determining unit configured to determine a condition of the wind converter based on a comparison of the collected first and second data and the obtained association.

11. The apparatus of claim 10, wherein the determining unit comprises:
an estimation generating unit configured to generate an estimation of the second data based on the association and the collected first data; and
a condition determining unit configured to determine the condition of the wind converter based on a difference between the estimation of the second data and the collected second data.

12. The apparatus of claim 11, wherein the condition determining unit is further configured to:
in response to the difference being above a predefined threshold, identify the condition as abnormal; and
in response to the difference being below the predefined threshold, identify the condition as normal.

13. The apparatus of claim 12, further comprising:
a severity determining unit configured to, in response to the determined condition being abnormal, determine a severity of the wind converter based on a change over time in the difference;
a lifetime determining unit configured to determine a lifetime of the wind converter based on the determined severity; and
a cause determining unit configured to detect a cause of the abnormal condition based on monitoring a condition of at least one component in the wind converter.

14. The apparatus of claim 10, wherein the obtaining unit comprises:
a historical data collecting unit configured to collect historical first and second data associated with the group of first measurements and the second measurement of the wind converter, respectively; and
an association obtaining unit configured to obtaining the association by establishing a knowledge model based on the collected historical first and second data.

15. The apparatus of claim 14, wherein the historical data collecting unit is further configured to collect the historical first and second data during a period when the condition of the wind converter is normal.

16. The apparatus of claim 10, further comprising:
an adjusting unit configured to adjust an output power of the wind converter based on the determined condition.

17. The apparatus of claim 10, further comprising:
an adjusting unit configured to, with respect to a group of wind converters located in a wind farm in which the wind converter is located, adjust an output power dispatch among the group of converters based on the determined condition.

18. The apparatus of claim 10, wherein the forming unit is further configured to form the association by modifying the reference association based on: an operation period of the wind converter and the reference wind converter.

19. A system for managing a wind converter, comprising:
a computer processor coupled to a computer-readable memory unit, the memory unit comprising instructions on a non-transitory storage readable medium that when executed by the computer processor;
select a group of first measurements and a second measurement that have a relationship from a plurality of measurements of the wind converter based on a machine learning process, the group of first measurements and the second measurement being measurements for various components within the wind converter;
collect a first and a second data associated with the group of first measurements and the second measurement of a wind converter, respectively;
obtain an association between the group of first measurements and the second measurement of the wind converter, the memory unit further comprises instructions cause the at least one processors to:
select a reference association between a group of first measurements and a second measurement of a reference wind converter; and
obtain the association by modifying the reference association based on at least one of:
types of the wind converter and the reference wind converter; and
geographic locations of the wind converter and the reference wind converter; and
determine a condition of the wind converter based on a comparison of the collected first and second data and the obtained association.

20. A non-transitory storage readable medium having instructions stored thereon, the instructions, when executed on at least one processor, cause the at least one processor to execute instructions that comprise:
select a group of first measurements and a second measurement that have a causal relationship from a plurality of measurements of the wind converter based on a machine learning process, the group of first measurements and the second measurement being measurements for various components within the wind converter;
collect a first and a second data associated with the group of first measurements and the second measurement of a wind converter, respectively;
obtain an association between the group of first measurements and the second measurement of the wind converter, and the instructions further cause the at least one processors to:
select a reference association between a group of first measurements and a second measurement of a reference wind converter; and
obtain the association by modifying the reference association based on at least one of:
types of the wind converter and the reference wind converter; and
geographic locations of the wind converter and the reference wind converter; and
determine a condition of the wind converter based on a comparison of the collected first and second data and the obtained association.

* * * * *